US009902575B1

(12) United States Patent
Mack et al.

(10) Patent No.: US 9,902,575 B1
(45) Date of Patent: Feb. 27, 2018

(54) BIN AUGER APPARATUS WITH AUGER CLEARING POSITION

(71) Applicants: Jerome I. Mack, Leola, SD (US); Eric J. Miller, Leola, SD (US)

(72) Inventors: Jerome I. Mack, Leola, SD (US); Eric J. Miller, Leola, SD (US)

(73) Assignee: Jerome I. Mack, Leola, SD (US)

( * ) Notice: Subject to any disclaimer, the term of this patent is extended or adjusted under 35 U.S.C. 154(b) by 145 days.

(21) Appl. No.: 14/965,306

(22) Filed: Dec. 10, 2015

Related U.S. Application Data

(60) Provisional application No. 62/090,162, filed on Dec. 10, 2014.

(51) Int. Cl.
 *B65G 65/46* (2006.01)
 *A01F 25/20* (2006.01)
 *B65G 65/48* (2006.01)

(52) U.S. Cl.
 CPC ........ *B65G 65/466* (2013.01); *A01F 25/2018* (2013.01); *B65G 65/4836* (2013.01)

(58) Field of Classification Search
 CPC .............. A01F 25/2018; B65G 65/466; B65G 65/4836
 USPC ................................. 414/310, 312
 See application file for complete search history.

(56) References Cited

U.S. PATENT DOCUMENTS

| 4,619,577 A * | 10/1986 | Swanson | B65G 65/466 198/587 |
| 5,180,272 A * | 1/1993 | Campbell | B65G 65/22 198/518 |
| 5,960,932 A * | 10/1999 | Adams | B65G 65/466 198/550.6 |
| 8,210,342 B2 * | 7/2012 | Lepp | B65G 65/466 198/801 |
| 9,288,946 B1 * | 3/2016 | Schuld | A01F 25/2018 |
| 9,650,217 B1 * | 5/2017 | Hoogestraat | B65G 65/466 |
| 2005/0254922 A1 * | 11/2005 | Berreau | B65G 65/466 414/310 |
| 2005/0263372 A1 * | 12/2005 | Hollander | B65G 65/466 198/550.1 |

FOREIGN PATENT DOCUMENTS

CA  2312068 A1 * 12/2001 ........... B65G 65/466

* cited by examiner

*Primary Examiner* — James Keenan
(74) *Attorney, Agent, or Firm* — Jeffrey A. Proehl; Woods, Fuller, Shultz & Smith P.C.

(57) ABSTRACT

An auger system for removing particulate material from an interior of s storage bin having a bin floor with a center and a periphery. The auger system may comprise an outflow auger for positioning from the center of the bin floor to the periphery of the bin floor to move the particulate material from the center to the periphery, an inflow auger for positioning from the periphery of the bin floor to the center of the bin floor to move the particulate material toward the center of the bin floor to feed particulate material to the outflow auger; and a movement assembly configured to move the inflow auger with respect to the outflow auger. The system may also include a lift assembly configured to lift the inflow auger upwardly with respect to the bin floor from a lowered operational position to a raised, clearing position.

20 Claims, 6 Drawing Sheets

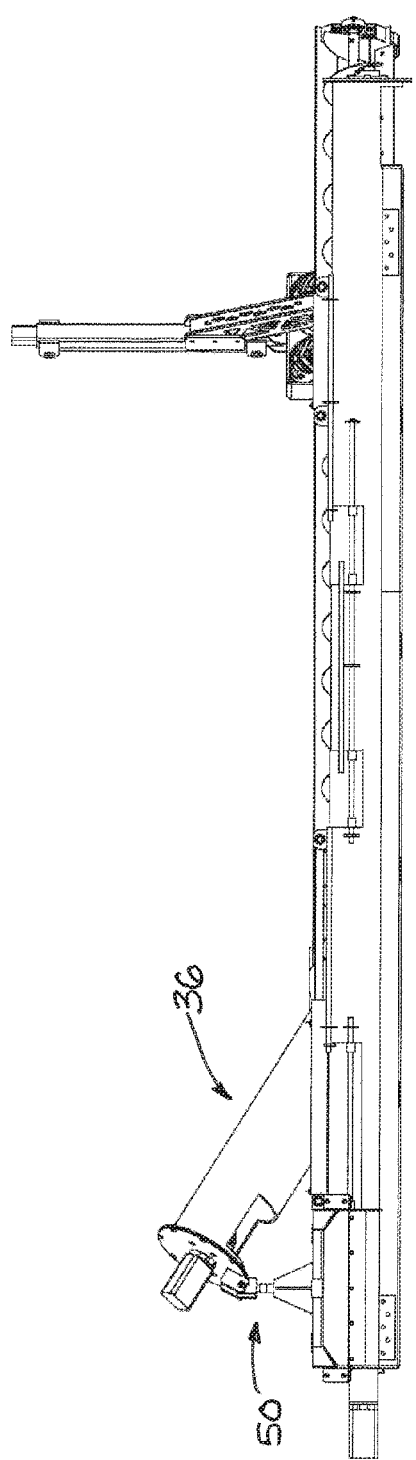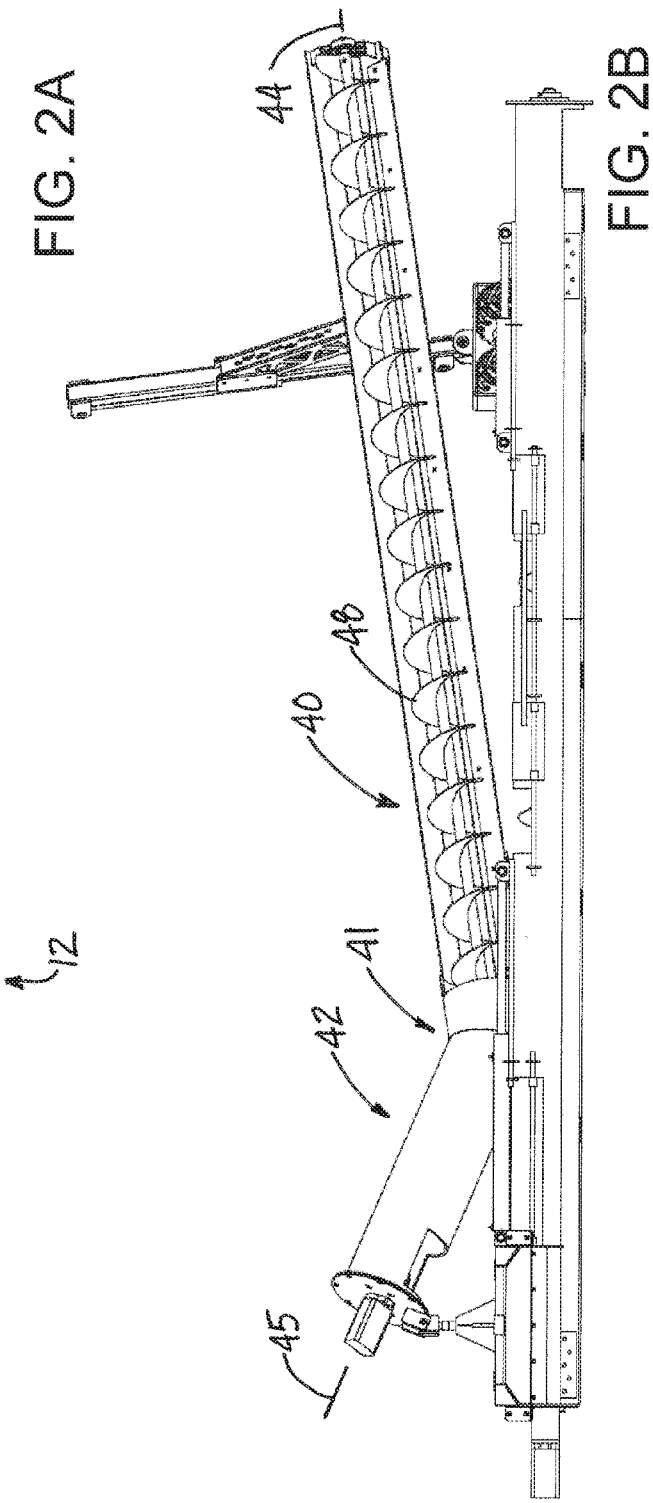

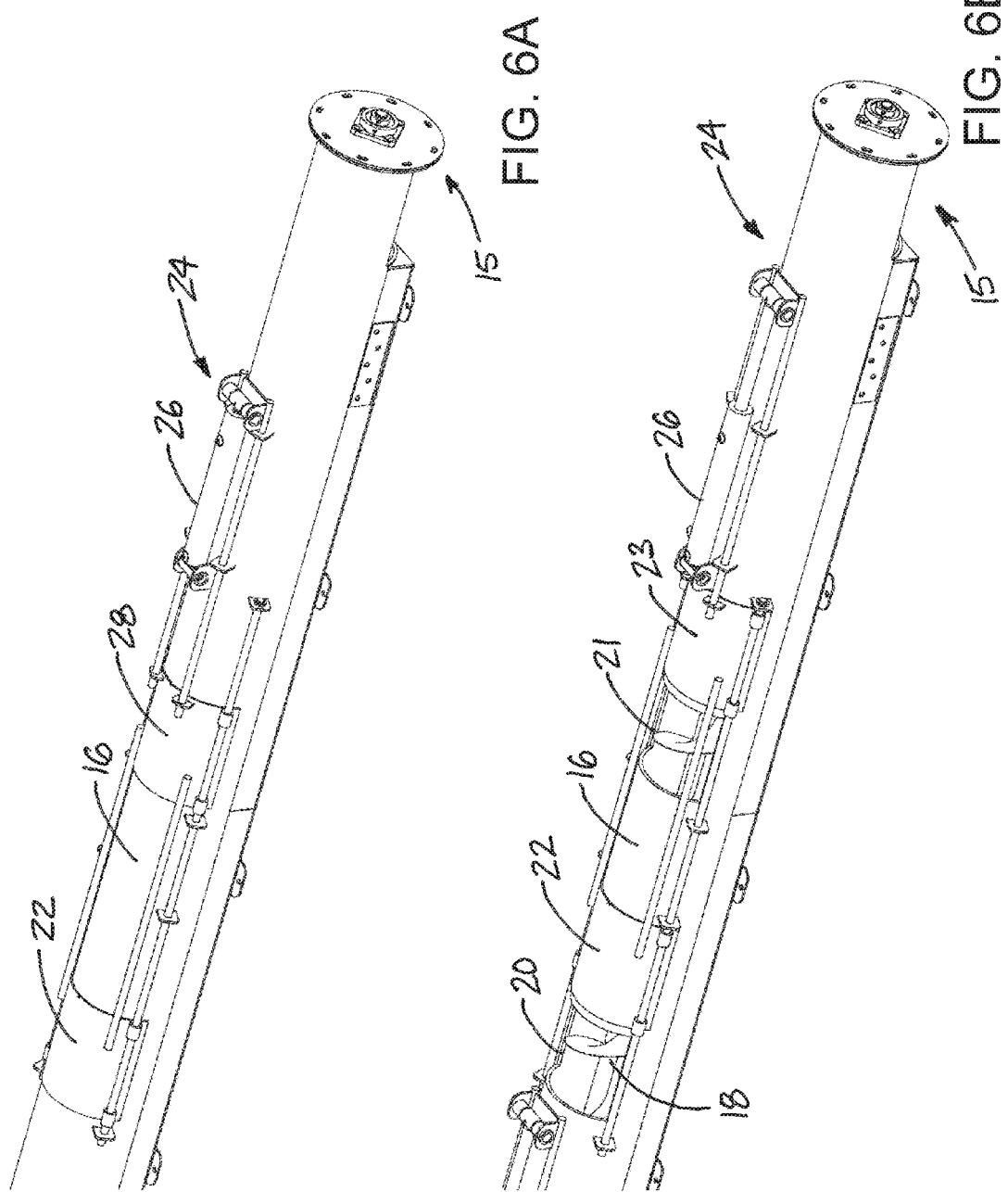

BIN AUGER APPARATUS WITH AUGER CLEARING POSITION

REFERENCE TO RELATED APPLICATION

This application claims the benefit of U.S. Provisional Patent Application No. 62/090,162, filed Dec. 10, 2014, which is hereby incorporated by reference in its entirety.

BACKGROUND

Field

The present disclosure relates to bin augers and more particularly pertains to a new bin auger apparatus with auger clearing position for facilitating the removal of an auger from a pile of particulate material in a bin.

SUMMARY

The present disclosure relates to an auger system for removing particulate material from an interior of s storage bin having a bin floor with a center and a periphery. The auger system may comprise an outflow auger for positioning from the center of the bin floor to the periphery of the bin floor to move the particulate material from the center to the periphery, an inflow auger for positioning from the periphery of the bin floor to the center of the bin floor to move the particulate material toward the center of the bin floor to feed particulate material to the outflow auger; and a movement assembly configured to move the inflow auger with respect to the outflow auger. The system may also include a lift assembly configured to lift the inflow auger upwardly with respect to the bin floor from a lowered operational position to a raised, clearing position.

In another aspect, the disclosure relates to an auger system for removing particulate material from an interior of s storage bin, with the bin having a bin floor with a center and a periphery. The auger system may comprise an outflow auger for positioning from the center of the bin floor to the periphery of the bin floor to move the particulate material from the center to the periphery and an inflow auger for positioning from the periphery of the bin floor to the center of the bin floor to move the particulate material toward the center of the bin floor to feed particulate material to the outflow auger. The system may also include a movement assembly configured to move the inflow auger with respect to the outflow auger, and a lift assembly connecting the movement assembly to the inflow auger and being configured to lift the inflow auger upwardly away from the bin floor from a lowered operational position to a raised, clearing position in which the inflow auger is spaced from the bin floor to permit the inflow auger to move over bin contents.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 2A is a schematic front side view of the apparatus with the inflow auger shown in the lowered operational position, according to an illustrative embodiment.

FIG. 2B is a schematic front side view of the apparatus with the inflow auger shown in the raised clearing position, according to an illustrative embodiment.

FIG. 6A is a schematic upper perspective view of the apparatus showing the hatches in the closed position, according to an illustrative embodiment.

FIG. 6B is a schematic upper perspective view of the apparatus showing the hatches in the open position, according to an illustrative embodiment.

DETAILED DESCRIPTION

Figure 1:
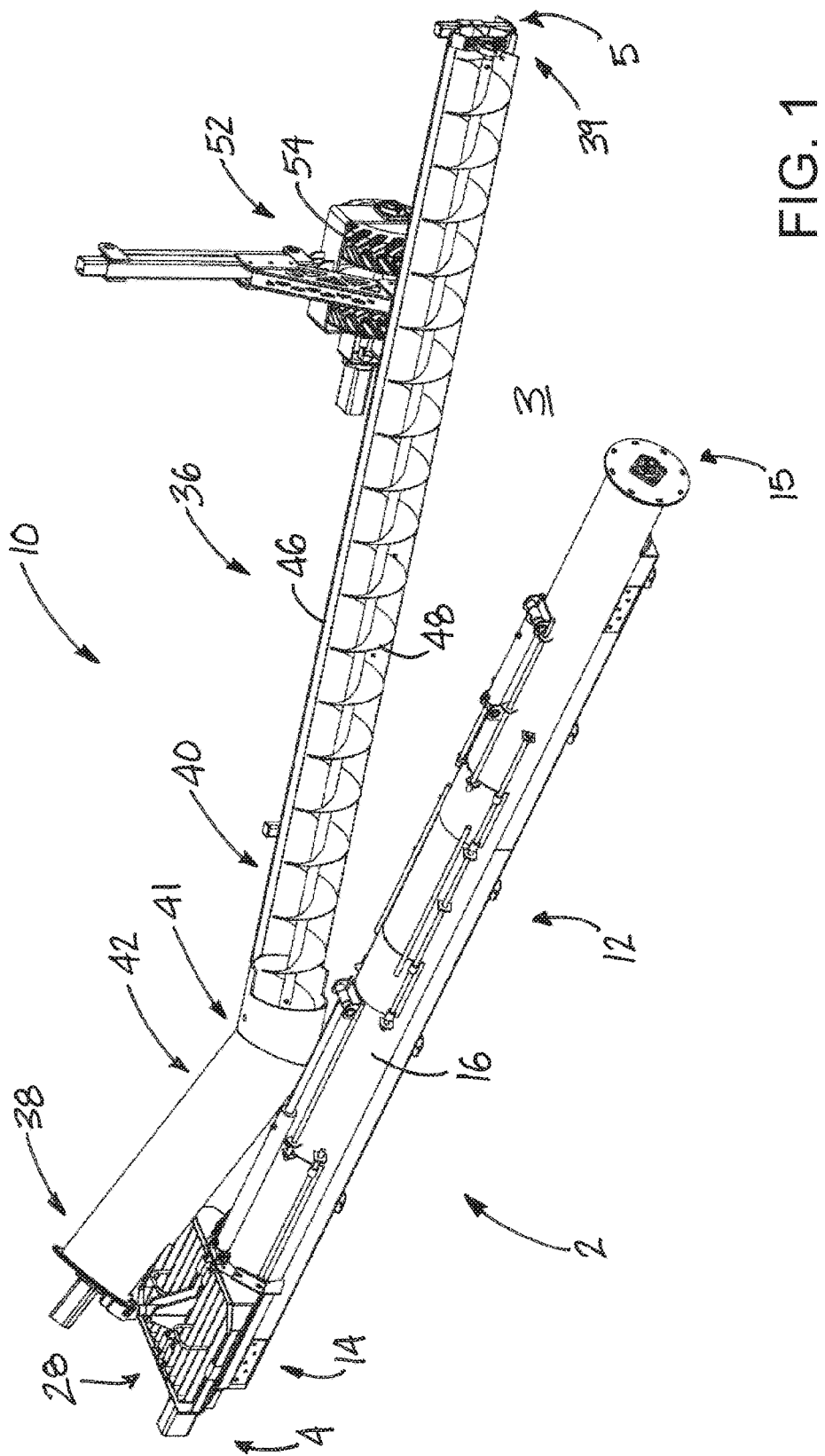
FIG. 1 is a schematic upper perspective view of a new bin auger apparatus according to the present disclosure.
Figure 3A:
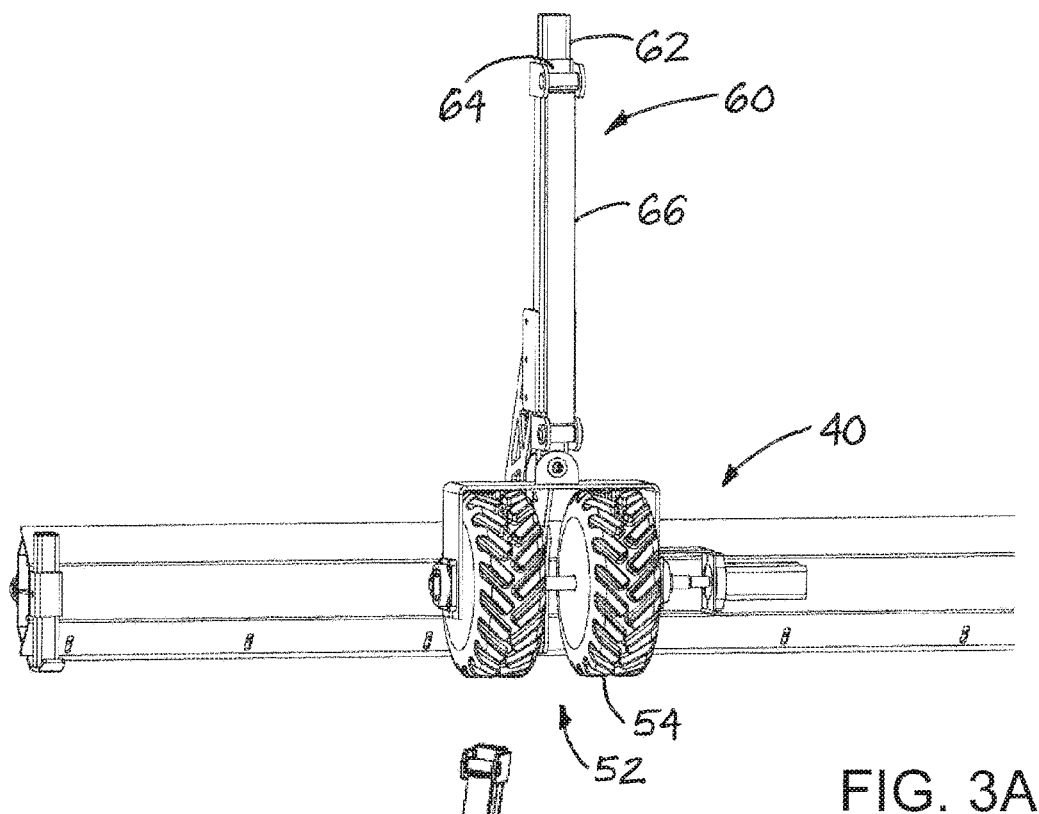
FIG. 3A is a schematic rear side view of the apparatus with the inflow auger shown in the operational position, according to an illustrative embodiment.
Figure 3B:
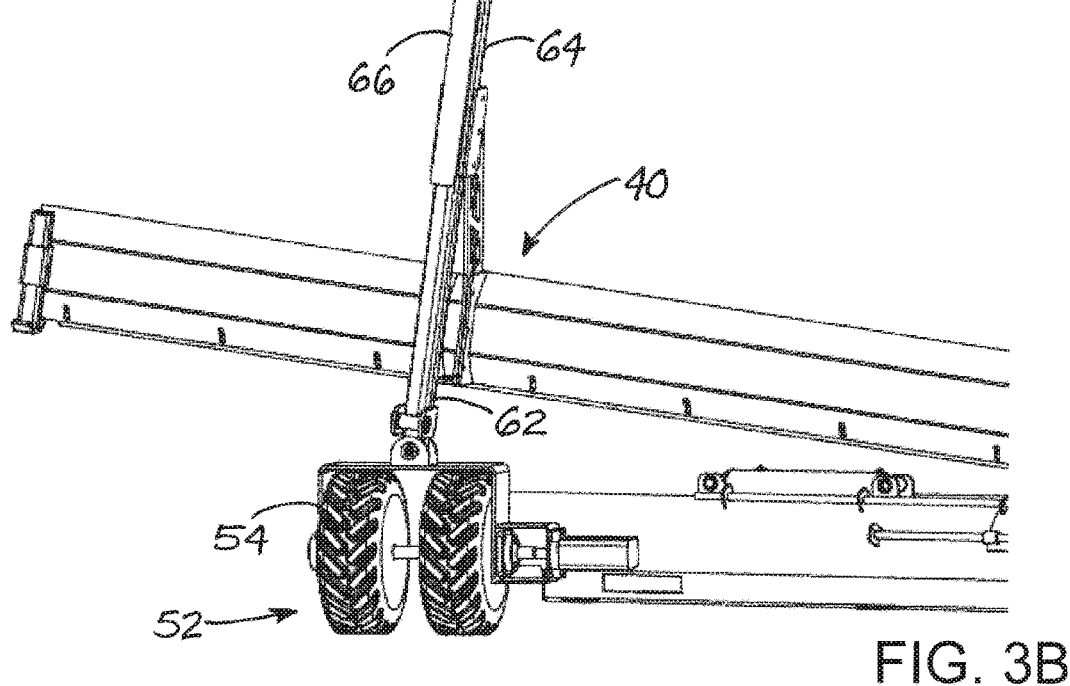
FIG. 3B is a schematic rear side view of the apparatus with the inflow auger shown in the raised position, according to an illustrative embodiment.
Figure 4:
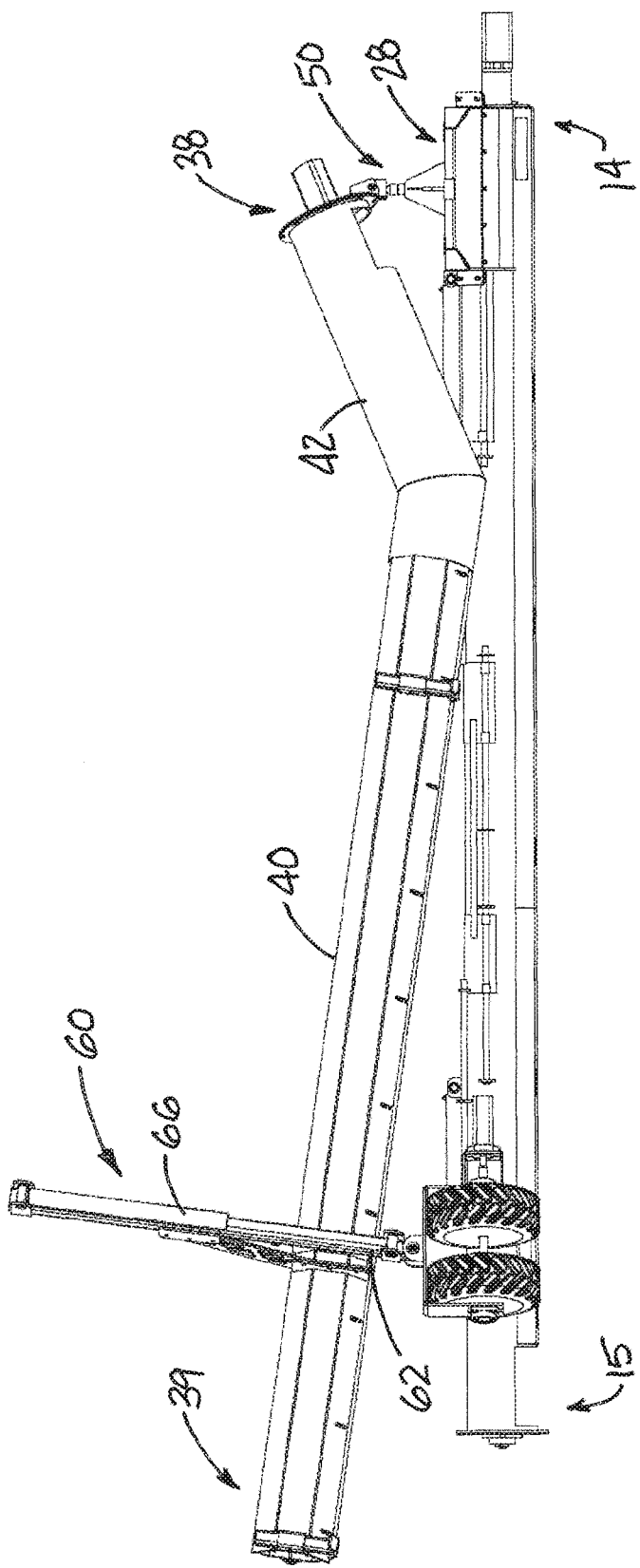
FIG. 4 is a schematic rear side view of the apparatus with the inflow auger shown in the raised position, according to an illustrative embodiment.
Figure 5A:
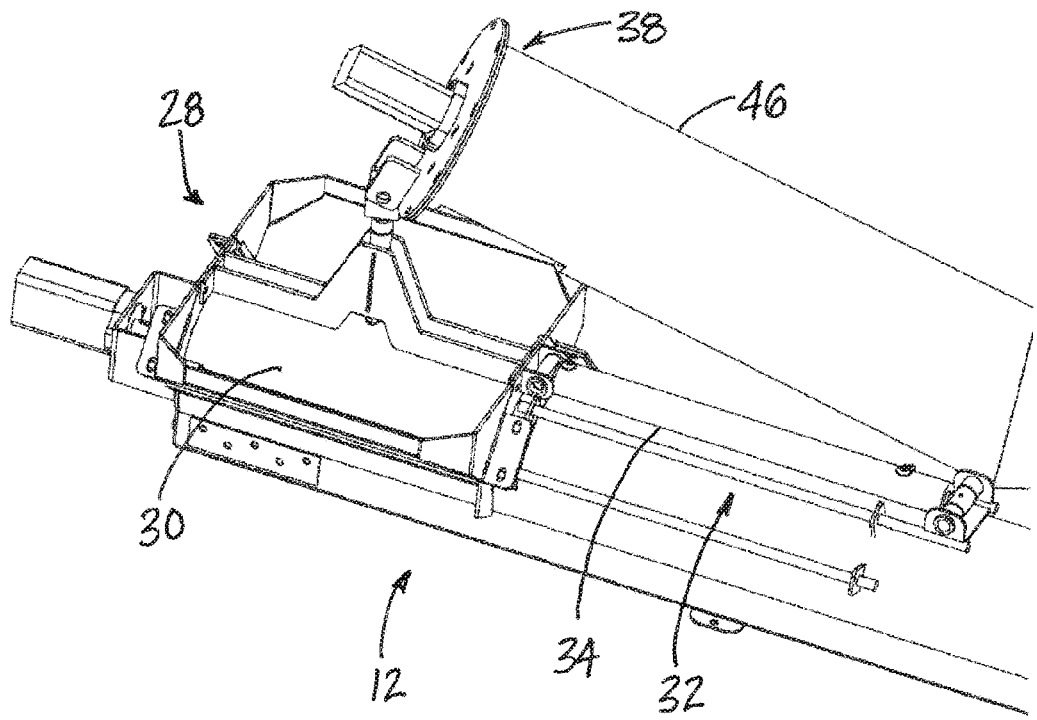
FIG. 5A is a schematic upper perspective view of the apparatus showing the gate of the feed hopper in the closed position, according to an illustrative embodiment.
Figure 5B:
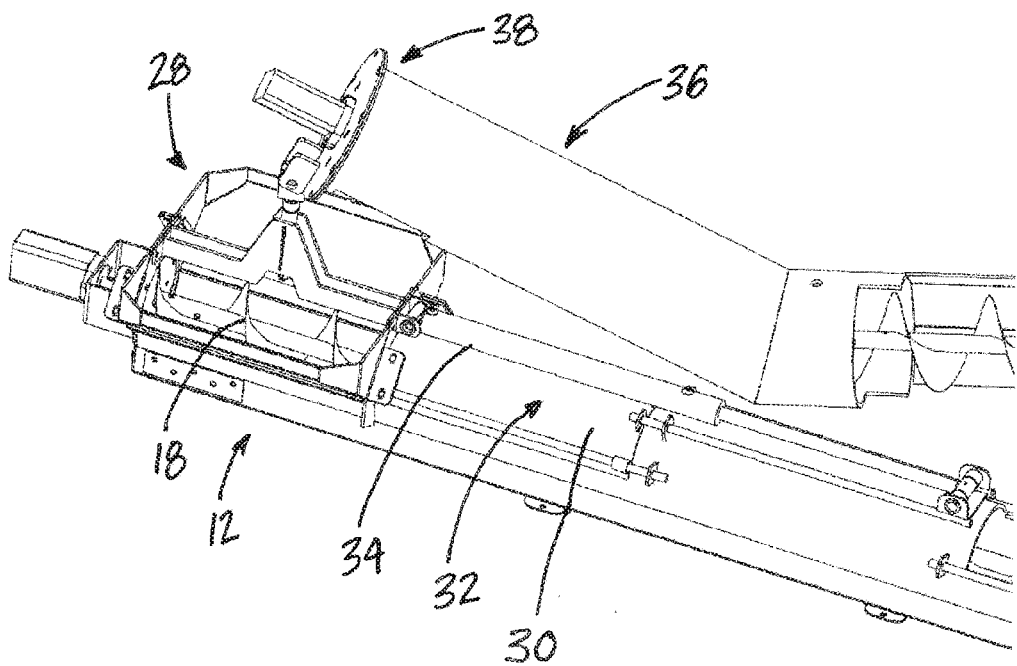
FIG. 5B is a schematic upper perspective view of the apparatus showing the gate of the feed hopper in the open position, according to an illustrative embodiment.

With reference now to the drawings, and in particular to FIGS. 1 through 6 thereof, a new bin auger apparatus with auger clearing position embodying the principles and concepts of the disclosed subject matter will be described.

Applicants have recognized that the removal of particulate material from a storage bin using an auger-based system can be highly effective but can also result in an auger becoming trapped within the particulate material which prevents the auger from moving and/or causes bogging down or even jamming of the auger operation. An auger is most effectively utilized when it is moving forwardly from a space within the bin that is generally clear of particulate material toward an accumulation or pile of particulate material so that the auger is able to "bite" into the periphery of the pile. However, there are instances in which the conditions may allow particulate material to move into a position behind or rearward of the auger, which may effectively hamper movement of the auger across the bin floor and in some situations the rotation of the auger flighting itself. This may be caused, for example, by an avalanche of particulate material from the pile of material being engaged by the auger. One solution to a trapped or jammed auger is for a person to enter the interior of the bin and dig the auger out of the avalanched material; however, this is highly undesirable as it can be very dangerous due to the possibility of further avalanches from the pile occurring that would trap the person.

While other approaches exist, the applicants have devised a highly beneficial solution to the problem of a trapped or stuck auger that permits the auger apparatus with the ability to lift the trapped auger out of the normal operating position, and out of the avalanched accumulation of material, in order to free the auger from a trapped condition so that the auger may be moved out of the trapped position, often using the auger's movement apparatus.

In one aspect, the disclosure relates to an auger system 10 for removing particulate material from an interior 2 of a storage bin having a bin floor 3. The bin floor generally has a center 4 and a periphery 5 that extends about the periphery of the bin and may be circular and centered about the center 4. Illustratively, the particulate material is a grain such as corn or soybeans, although any material having similar physical characteristics may be handled by the disclosed auger system 10.

Generally, the auger system 10 may include an outflow auger 12 for moving particulate material from the center 4 to the periphery 5, an inflow auger 36 that moves the material toward the center, a movement assembly 52 for moving the inflow auger, and a lift assembly 60 for raising and lowering the inflow auger.

In greater detail, the outflow auger 12 may be suitably positioned to extend from the center 4 of the bin floor to the periphery 5 of the bin floor in a radial direction through the auger 12 from the center toward the periphery. Typically, although not critically, the outflow auger may be positioned above the bin floor. Although the outflow auger 12 is primarily loaded from the center location of the bin floor, it will become apparent from the following description that openings in the auger 12 along its length may form additional points of entry for the particulate material into the auger. The outflow auger 12 may have a center end 14 for positioning generally adjacent to the center 4 of the bin floor, and also a periphery end 15 for generally positioning toward the periphery 5 of the bin floor.

The outflow auger 12 may include an outflow auger tube 16 which defines an interior, and an outflow auger flighting 18 which is positioned in the interior of the outflow auger tube and is generally rotatable with respect to the tube to move particulate in the tube along the length of the tube. The flighting 18 generally has a helical shape rotatable about a central longitudinal axis to cause movement of any particulate material positioned in the interior of the tube 16 to move in a direction dictated by the particular rotational direction of the auger flighting 18. In some embodiments, at least one opening 20 is formed in the outflow auger tube 16, and a hatch 22 may be mounted on the auger tube and may be configured to selectively close the opening 20. The opening 20 may provide a point of entry for the particulate material in the interior of the bin to enter the interior of the auger tube 16, and the hatch may be movable between a closed position (see FIG. 6A) in which the hatch covers the opening 20 and an open position (see FIG. 6B) uncovering the opening so that particulate material may enter the interior. In the illustrative embodiments, the hatch is slidable between the closed and open positions, although other manners of movement of the hatch may be utilized.

The outflow auger 12 may also comprise a hatch movement assembly 24 for moving the hatch 22 between the open and closed positions, and may include at least one hatch actuator 26 which is configured to slide the hatch along the auger tube 16 between the open and closed positions. Illustratively, the hatch actuator 26 may comprise a piston-cylinder device, such as a hydraulically- or pneumatically-driven piston and cylinder, although other types of actuators, such as linear actuators, may also be used. The hatch movement assembly may also include a guide rod along which the hatch is slidable for guiding the movement of the hatch between the open and closed positions.

In the illustrative embodiments, the outflow auger may include a pair of openings 20, 21 and a corresponding pair of hatches 22, 23 with each hatch being configured to selectively close one of the openings. In some embodiments, the hatch movement assembly 24 may be configured to move both hatches 22, 23 between open and closed positions, although separate movement of the hatches by one or more hatch movement assemblies 24 may also be utilized.

The outflow auger 12 may also include a feed hopper 28 which is located generally at the center end 14 of the outflow hopper for receiving particulate material for movement by the outflow auger towards the periphery end 15. Illustratively, the feed hopper 28 may have a funnel shape with a relatively larger top opening. A gate 30 may be mounted on the feed hopper and be configured to selectively close the center end of the outflow auger from receiving particulate material through the feed hopper. The gate may be movable between a closed position (see FIG. 5A) and an open position (see FIG. 5B), and in the illustrative embodiments the gate is slidable between the closed and open positions. The closed position may be characterized by the gate covering the center end of the outflow auger, thus preventing it from receiving any particulate material contained in the hopper, and the open position may be characterized by the center end being uncovered and able to receive particulate material located in the feed hopper. A gate movement assembly 32 may be provided for moving the gate 30 between the open and closed positions, and illustratively the gate movement assembly includes at least one gate actuator 34 for acting on the gate to slide it between the respective positions. In some embodiments, the gate actuator comprises a piston-cylinder device, such as a hydraulically- or pneumatically-actuated device, although again other types of actuators may also be employed. The gate movement assembly 32 may also include at least one guide rod along which the gate 30 is slidable.

The inflow auger 36 of the auger system 10 may be configured for positioning from the periphery 5 to the center 4 of the bin floor to generally move particulate material toward the center of the bin floor. The inflow auger may be configured to feed particulate material to the outflow auger 12, and more specifically to the feed hopper 28 of the outflow auger. The inflow auger may have an inboard end 38 generally located towards the center 4 of the bin floor and an outboard end 39 generally located toward the periphery 5. The inflow auger may have an elbow 41 located between the inboard and outboard ends of the auger 36. The inflow auger may have a main portion 40 which is generally located between the outboard end 39 and the elbow 41, and an inclined portion 42 which is located between the elbow and the inboard end 38. The main portion 40 may have a main longitudinal axis 44 and the incline portion 42 may have an inclined longitudinal axis 45 (see FIG. 2B) and the main longitudinal axis may be angled with respect to the inclined longitudinal axis. In some embodiments, the main portion may extend substantially horizontally along the bin floor and the inclined portion may extend generally upwardly from the main portion to a location that is located above the feed hopper of the outflow auger 12.

The inflow auger may comprise an inflow auger tube 46 which defines an interior, and an outflow auger flighting 48 which is positioned in the interior of the inflow auger tube and is rotatable with respect to the tube 46. A joint structure 50 may pivotally connect the inflow auger to the outflow auger, and may connect the inboard end of the inflow auger to the center end of the outflow auger to permit generally rotational movement of the inflow auger with respect to the outflow auger. By this structure, the inflow auger may be able to rotate about the center of the bin floor while the outflow auger remains relatively stationary with respect to the bin floor.

The movement assembly 52 may be configured to move the inflow auger with respect to the outflow auger as well as the bin floor. The movement assembly may be connected to the inflow auger tube and may be positioned along the main portion of the inflow auger at a location relatively closer to the outboard end 39 than the inboard end 38 or the elbow. The movement assembly 52 may include at least one wheel 54 for resting on the bin floor, and illustratively includes a pair of wheels rotatable with each other. The movement assembly may also include a motor that is configured to rotate the one or more wheels 54, and the motor may be powered in any suitable manner, including by hydraulic, pneumatic, or electrical means.

The lift assembly 60 of the auger system 10 may be configured to lift the inflow auger 36 upwardly with respect to the bin floor on which the inflow auger is generally support (i.e., through the movement assembly 52). The lift assembly may be configured to move the inflow auger between a lowered, operational position and a raised, clearing position. The lowered, operational position (see FIGS. 2A and 3A) may be characterized by the inflow auger being positioned adjacent to the bin floor and be able to engage and move particulate material that is resting on the surface of the bin floor. Thus, movement of the inflow auger by the movement assembly into and against an accumulation or pile of particulate material tends to allow the flighting 48 of the inflow auger to engage and push against the particulate material. The raised, clearing position (see FIGS. 2B and 3B) is generally characterized by the inflow auger being generally moved out of contact with the bin floor and away from the bin floor into a position and orientation in which the inflow auger may be incapable of engaging and pushing against particulate material that is positioned on the bin floor.

The lift assembly 60 may be positioned between the movement assembly 52 and the inflow auger 32 and may function to connect the movement assembly to the inflow auger. Thus, the lift assembly may be positioned on the main portion of the inflow auger, and may be positioned at a location on the main portion that is spaced from the elbow 41. The location of the lift assembly may also be spaced from the outboard end 39 of the inflow auger. Illustratively, the lift assembly 60 may include a post 62 that is mounted on the movement assembly 52, and may extend upwardly from the assembly 52 in a generally vertical orientation. The post may have an upper end which is a free end, and may also have a lower end which is mounted on the movement assembly. In some embodiments, the lower end may be movable or pivotable with respect to the movement assembly. The lift assembly 60 may also include a sleeve 64 which receives at least a portion of the post 62 and the sleeve may be mounted on the inflow auger, such as on the main portion of the auger 36. The sleeve 64 may be generally slidable along the at least a portion of the length of the post as the lift assembly moves between the lowered operational and the raised clearing position.

The lift assembly may also comprise a lift actuator 66 which is configured to move the sleeve along the post to lift the inflow auger with respect to the bin floor, and generally move the inflow auger between the lowered operational position and the raised clearing position. The lift actuator 66 may be connected to the sleeve and to the post, such that extension and contraction of the lift actuator tends to move the sleeve along the post between various positions. The lift actuator 66 may thus provide an infinite variety of positions of the sleeve along the post, and a variety of positions of the inflow auger between the lowered operational position and the raised clearing position. The lift actuator may comprise a piston-cylinder device, and the device may be hydraulically- or pneumatically-powered, although device types capable of similar movement may be utilized, such as linear actuators.

In use, the inflow and outflow augers may be operated with the respective flighting rotating to move any particulate material within the respective tubes either towards the center 4, such as the case with the inflow auger, or toward the periphery 5, such as the case with the outflow auger. The movement assembly 52 may be operated to move the inflow auger towards a pile of particulate material positioned on the bin floor of the bin, and push the auger 36 against the pile of material. If the inflow auger becomes unable to move due to, for example, particulate material being positioned on both the front and rear sides of the auger tube (such as when the particulate material "avalanches" over the inflow auger), the lift assembly may be actuated to move the inflow auger out of the lowered operational position and toward the raised clearing position to attempt to free the inflow auger from its position within the accumulation of particulate material. Optionally, the movement assembly may be operated to move the inflow auger in a forward or rearward direction to a location within the bin that does not present as much of a problem with respect to operation of the inflow auger. Upon reaching such a location, the lift assembly may lower the inflow auger down towards the operational position, and normal operation of the system may resume with the movement assembly moving the inflow auger towards a pile of material.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An auger system for removing particulate material from an interior of a storage bin, the bin having a bin floor with a center and a periphery, the auger system comprising:
   an outflow auger for positioning from the center of the bin floor to the periphery of the bin floor to move the particulate material from the center to the periphery;
   an inflow auger for positioning from the periphery of the bin floor to the center of the bin floor to move the particulate material toward the center of the bin floor to feed particulate material to the outflow auger, the inflow auger having an inboard end for positioning toward the center of the bin floor and an outboard end for positioning toward the periphery of the bin floor, a length of the inflow auger being defined between the inboard and outboard ends, the inflow auger having a lowered operational position and a raised clearing position, the lowered operational position being characterized by at least a portion of the length of the inflow auger being oriented substantially parallel to the bin floor to permit operation of the auger to move the particulate material toward the center of the bin floor, the raised clearing position being characterized by the outboard end of the inflow auger being raised with respect to the bin floor such that a portion of the length of the inflow auger is angled upwardly with respect to the bin floor and over particulate matter on the bin floor so as to be incapable of moving particulate material on the bin floor toward the center of the bin floor;
   a movement assembly configured to move the inflow auger with respect to the outflow auger; and
   a lift assembly configured to lift the inflow auger upwardly with respect to the bin floor from the lowered operational position to the raised, clearing position;
   wherein the lift assembly includes a powered lift actuator acting between the movement assembly and the lift assembly such that application of power to the lift actuator pushes upwardly on the inflow auger to raise the inflow auger from the lowered operational position to the raised clearing position and pulls downwardly on the inflow auger to lower the inflow auger from the raised clearing position to the lowered operational position.

2. The system of claim 1 wherein the lift assembly is configured to lift the inflow auger out of contact with the bin floor in the clearing position.

3. The system of claim 1 wherein the lift assembly connects the movement assembly to the inflow auger.

4. The system of claim 3 wherein the inflow auger has a main portion located between the outboard end and an elbow and an inclined portion located between the elbow and the inboard end, the lift assembly being connected to the main portion.

5. The system of claim 1 wherein the lift assembly comprises a post mounted on and extending upwardly from the movement assembly.

6. The system of claim 5 wherein the post has an upper end which is a free end and a lower end which is mounted on the movement assembly.

7. The system of claim 6 wherein the lower end is pivotable with respect to the movement assembly.

8. The system of claim 5 wherein the lift assembly includes a sleeve mounted on the inflow auger and receiving a portion of the post and being movable along the post.

9. The system of claim 8 wherein the lift actuator is configured to move the sleeve along the post to lift the inflow auger with respect to the bin floor.

10. The system of claim 1 wherein the lift actuator comprises a piston-cylinder device.

11. The system of claim 1 wherein the lift actuator is operated pneumatically.

12. The system of claim 1 wherein the movement assembly includes at least one wheel and a motor configured to rotate the at least one wheel.

13. The system of claim 1 wherein the lift assembly is connected to the inflow auger at a location that is closer to the outboard end than the inboard end.

14. The system of claim 1 wherein the inflow auger includes an inflow augur tube defining an interior and an inflow auger flighting positioned in the interior of the inflow auger tube and being rotatable with respect to the tube.

15. The system of claim 1 wherein the lift assembly is configured to lift the inflow auger from the lowered operational position out of an accumulation of particulate material positioned on the inflow auger to free the inflow auger from the accumulation of particulate material.

16. The system of claim 1 wherein the movement assembly is configured to move the inflow auger when the inflow auger is in the raised clearing position and then lower the inflow auger to the lowered operational position.

17. An auger system for removing particulate material from an interior of a storage bin, the bin having a bin floor with a center and a periphery, the auger system comprising:
   an outflow auger for positioning from the center of the bin floor to the periphery of the bin floor to move the particulate material from the center to the periphery;
   an inflow auger for positioning from the periphery of the bin floor to the center of the bin floor to move the particulate material toward the center of the bin floor to feed particulate material to the outflow auger, the inflow auger having an inboard end for positioning toward the center of the bin floor and an outboard end for positioning toward the periphery of the bin floor, a length of the inflow auger being defined between the inboard and outboard ends, the inboard end of the inflow auger being pivotally mounted on the outflow auger such that the inflow auger is pivotable in a vertical plane between a lowered operational position and a raised clearing position, the lowered operational position being characterized by at least a portion of the length of the inflow auger being oriented substantially parallel to the bin floor to permit operation of the auger to move the particulate material toward the center of the bin floor, the raised clearing position being characterized by the outboard end of the inflow auger being raised with respect to the bin floor such that a portion of the length of the inflow auger is angled upwardly with respect to the bin floor and over particulate matter on the bin floor so as to be incapable of moving particulate material on the bin floor toward the center of the bin floor;

a movement assembly configured to move the inflow auger in a substantially horizontal plane with respect to the outflow auger; and a lift assembly connecting the movement assembly to the inflow auger and being configured to vertically pivot the inflow auger to lift the inflow auger upwardly away from the bin floor from the lowered operational position to the raised, clearing position in which the inflow auger is spaced from the bin floor to permit the inflow auger to move over bin contents;

wherein the lift assembly includes a powered lift actuator acting between the movement assembly and the lift assembly such that application of power to the lift actuator pushes upwardly on the inflow auger to raise the inflow auger from the lowered operational position to the raised clearing position and pulls downwardly on the inflow auger to lower the inflow auger from the raised clearing position to the lowered operational position.

18. The system of claim 17 wherein the lift assembly comprises a post mounted on and extending upwardly from the movement assembly, and a sleeve mounted on the inflow auger and receiving a portion of the post and being movable along the post.

19. The system of claim 18 wherein the lift actuator is configured to move the sleeve along the post to lift the inflow auger with respect to the bin floor.

20. The system of claim 17 wherein the movement assembly includes at least one wheel and a motor configured to rotate the at least one wheel.

\* \* \* \* \*